US006616529B1

(12) United States Patent
Qian et al.

(10) Patent No.: US 6,616,529 B1
(45) Date of Patent: Sep. 9, 2003

(54) SIMULATION AND SYNTHESIS OF SPORTS MATCHES

(75) Inventors: Richard J. Qian, Camas, WA (US); Jeffery S. McVeigh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/597,773

(22) Filed: Jun. 19, 2000

(51) Int. Cl.[7] ................................................ G06F 17/30

(52) U.S. Cl. ............................... 463/1; 463/43; 700/90; 706/55

(58) Field of Search ............................ 463/1–4, 40–43; 273/317.1–317.6, 108.1–108.5, 277, 292, 298; 700/28, 90–93; 706/12, 14, 45–48, 50–55, 58, 62; 703/13–28

(56) References Cited

U.S. PATENT DOCUMENTS 5,067,079 A * 11/1991 Smith et al. .................. 463/3
5,411,259 A * 5/1995 Pearson et al. ............... 463/36
5,472,191 A * 12/1995 Hendricks ................... 273/244
5,769,714 A * 6/1998 Wiener et al. ........... 273/108.3
5,888,136 A * 3/1999 Herbert ....................... 463/22
5,901,956 A * 5/1999 Warmack .................... 273/244
6,012,721 A * 1/2000 Harnish ...................... 273/298
6,080,063 A * 6/2000 Khosla ........................ 463/42

* cited by examiner

*Primary Examiner*—Michael O'Neill
*Assistant Examiner*—Scott E. Jones
(74) *Attorney, Agent, or Firm*—Pillsbury Winthrop LLP

(57) ABSTRACT

A reality-based sports gaming network includes a hierarchical event model, a gaming engine, and an event synthesis engine. The event synthesis engine and the hierarchical event model work together to predict events in a sports match using a probabilistic inferential technique such as Bayesian networks. The Bayesian network is trained based on semantic events detected from a real version of the sports match.

19 Claims, 9 Drawing Sheets

From Fig. 2C, Play and Possession, Offside and Handball.

SIMULATION AND SYNTHESIS OF SPORTS MATCHES

BACKGROUND OF THE INVENTION

1. Field of the Invention

The present invention relates generally to the simulation of events, and more particularly, to the simulation and synthesis of sporting matches.

2. Description of Related Art

Conventional sport simulation games are electronic games that simulate, on a computer display or television screen, a sporting event. For example, a baseball game may allow users to select the type of pitches thrown, to control timing of the pitches thrown, to control the swing of the bat, and to control the movement of various fielders. Users enter the control information using input devices such as joysticks and keyboards.

Early sport simulation games simulated only the rules of the games. Individual players were depicted as generic computer generated models. More recent sport simulation games allow the users to pick known sporting teams, such as teams from a familiar professional league, and to even control individual computer players that are modeled based on real athletes in the professional league. For example, a star running back in a football game simulation may move faster than other running backs.

Although the performance and realism of sport simulation games has improved dramatically in recent years, conventional simulations are still based on static rules and player characteristics that are pre-entered during the games initial design. Thus, there is a need in the art for a more realistic sports gaming simulation that is able to simulate plays based on portions of a real match.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

A reality-based sports gaming network, as described herein, enables a realistic simulation of an event, such as a sporting match. The simulation may be based on a live version of the event. An event detection section identifies semantically significant events in the sporting match and organizes the events in a hierarchical model. The hierarchical model may be used to implement probabilistic reasoning to infer likely results of actions different from the actions taken during the actual match. In particular, an event synthesis section predicts outcomes or creates artificial events based on additional user input. A user may thus take control of a match, starting from the middle of the match, and play a game derived from the match.

Figure 1:
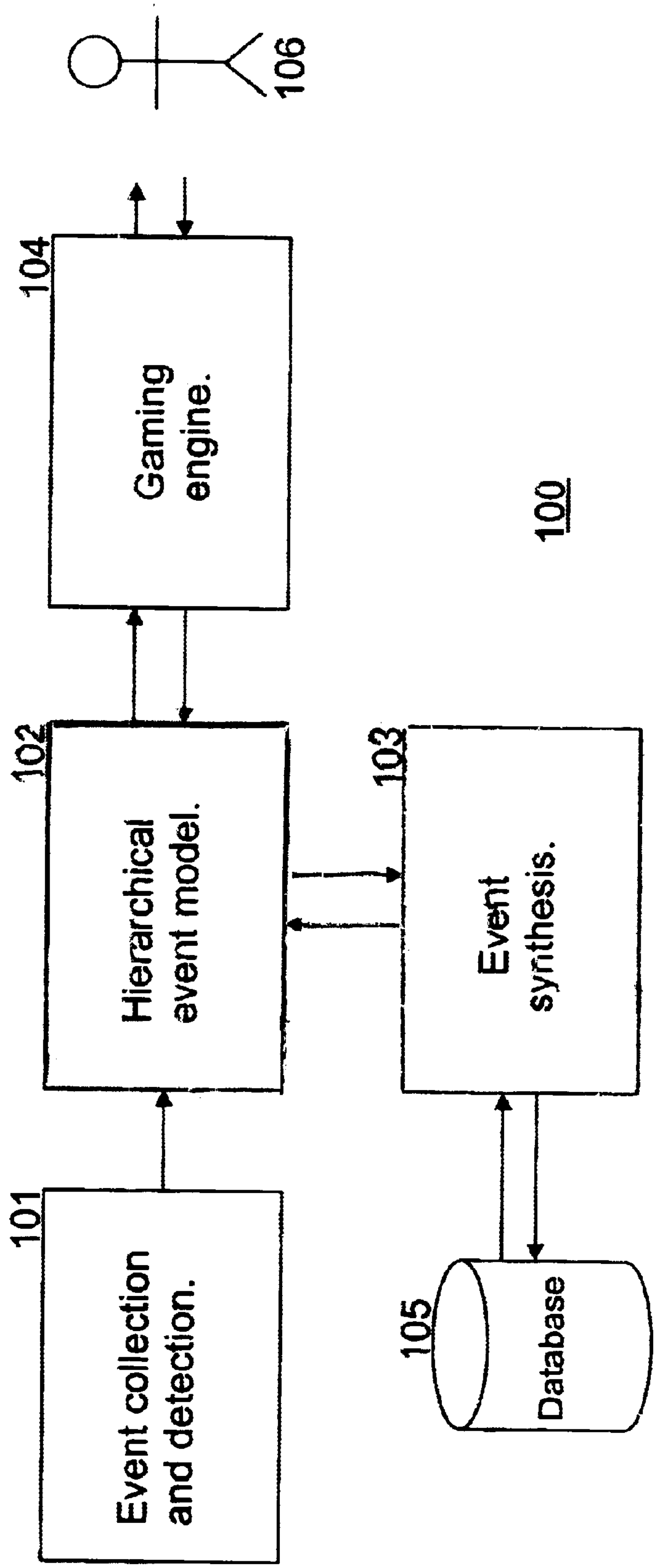
FIG. 1 is a high-level block diagram of a reality-based sports system.

FIG. 1 is a high-level block diagram of an implementation of a reality-based sports system. System 100 includes a data collection section 101 coupled to a hierarchical event model 102. Event synthesis section 103 interacts with hierarchical model 102 to synthesize events based on the hierarchical model 102 and optionally, on player attributes stored in database 105. The synthesized events are output to an end-user 106 via gaming engine 104.

Event detection and collection section 101 is used to collect data about a sporting match, such as a live broadcast of a soccer match. Data captured by event detection and collection section 101 may include video and audio data pertaining to the match. Based on the acquired data, event detection and collection section 101 extracts semantically meaningful events from the match. A semantic event is an event that is meaningful to the outcome of the match. In a soccer match, for example, player movements, ball movements, and player actions (such as kicking the ball or heading the ball) are all semantically meaningful events in the context of the soccer match.

The detection of semantic events can be performed using a variety of event detection techniques. In general, techniques for automatically extracting semantically significant events are known in the art. The paper "A Computational Approach to Semantic Event Detection," by Qian et al., Proc. IEEE Conference on Computer Vision and Pattern Recognition (1999), discloses one such automated semantic event detection technique for detecting semantic events from a video signal. As disclosed in this paper, "hunt" scenes from video footage of wildlife are automatically identified by a computer.

In order to improve object recognition and thus semantic detection in video footage, sensors, such as microwave or light-emitting-diode (LED) sensors, may be attached to the players and the ball. The sensors are detected by detectors positioned at different locations in the stadium. Three detectors detecting a single sensor receive enough information to locate the sensor in three-dimensions. In this manner, semantic event detection can be simplified relative to simply using an input video signal.

Optionally, instead of using automated semantic detection algorithms, semantic events could be manually extracted by humans entering the events into a computer.

Semantic events detected by event collection and detection section 101 may be performed in real-time during a live event and forwarded to hierarchical event model 102 for immediate game simulation. Alternatively, semantic events may be detected after the completion of the game and stored for later use.

Detected semantic events are transmitted to hierarchical event model 102. Event model 102 classifies events occurring in the match as a hierarchical series of events. A complete event model includes classifications for all the semantic events in the match that are to be used for simulation of the match. Because the event model is hierarchical, it can be represented as a graphic "tree" of events defining particular states in the match. Branches in the hierarchical model lead to sub-branches or end-nodes ("leafs") that define events that may occur given the parent event.

An exemplary template for a hierarchical event model for a soccer match is illustrated in FIGS. 2A–2G. In these figures, events or states are contained in rectangles. Events and states are generally associated at least with the positional information of the players and the ball at the time of the event. Control information relating to the logic flow between events is shown in diamonds or ovals.

Figure 2A:
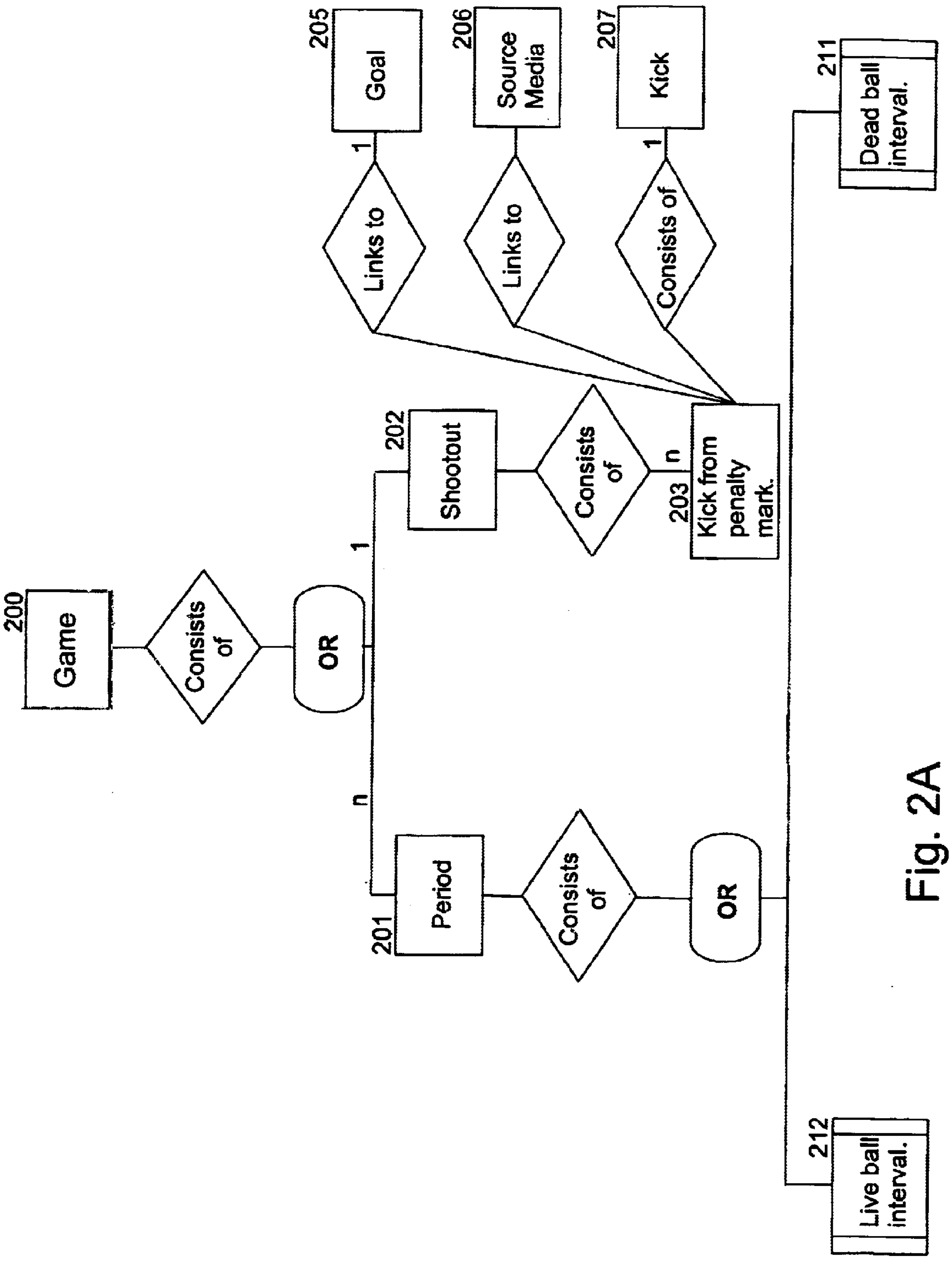
FIGS. 2A–2G are diagrams of a hierarchical model for a soccer match.

As shown in FIG. 2A, a soccer game event 200 represents a complete soccer game. Each game event 200 can consist of one or more playing period events 201 and a shootout event 202. Shootout event 202 consists of a penalty kick event 203, which itself consists of a kick event 207. Penalty kick event 203 may result in a goal event 205. Source media 206 specifies resources, such as a video clip of a penalty shot, that may be used to later reproduce the penalty kick event.

A period event 201 of a soccer game consists of a number of "Live Ball Intervals" 212 and "Dead Ball Intervals" 211.

Figure 2B:
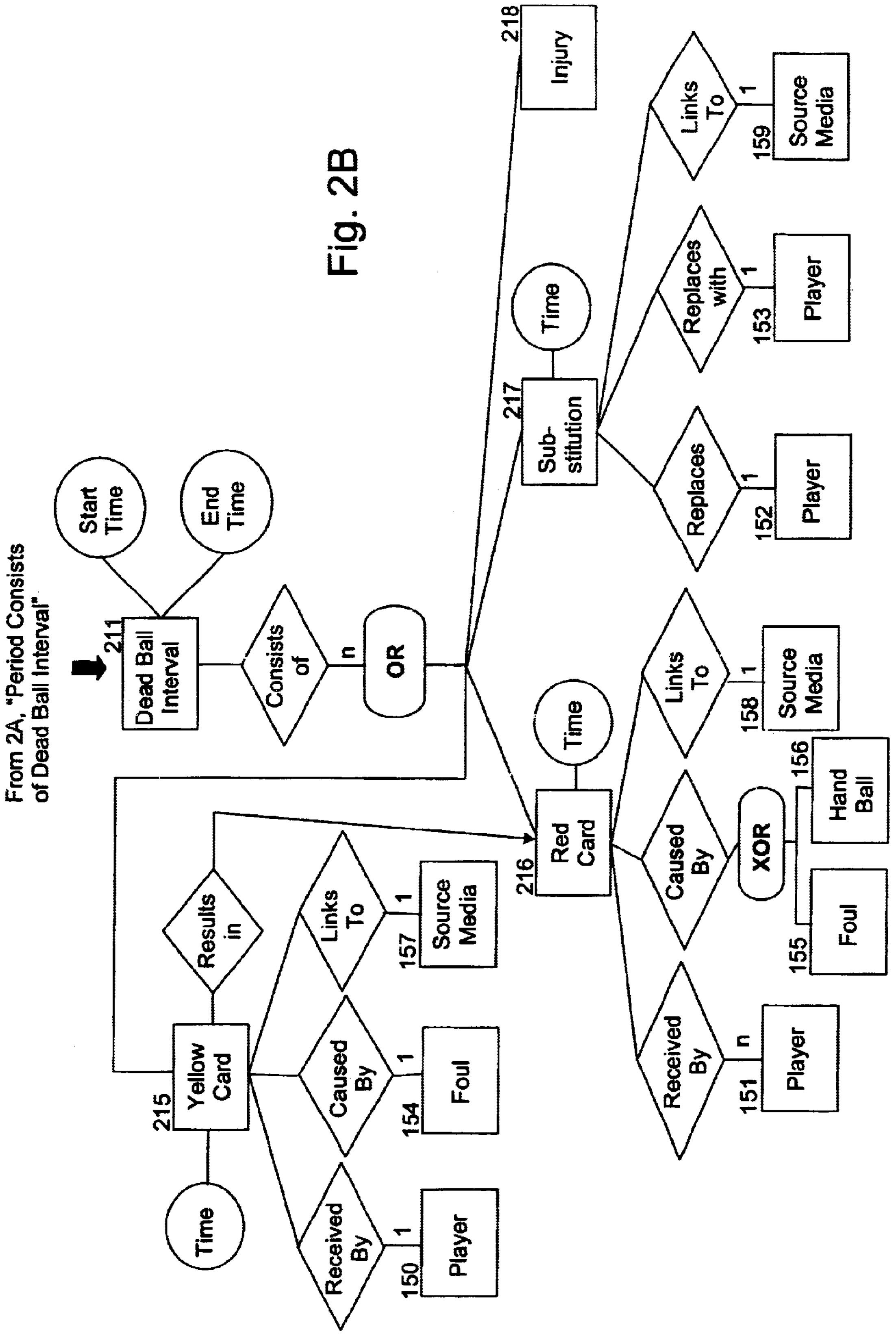

Events corresponding to a Dead Ball Interval are shown in FIG. 2B. Events in a dead ball interval include the possibility of a yellow card being given to a player 150 (yellow card event 215), a red card being given to a player 151 (red card event 216), a player substitution (substitution event 217), or an injury (injury event 218). As shown, yellow card event 215 has the property of being caused by a foul event 154 and is received by a player 150. Similarly, red card events 216 are caused by either a foul event 155 or a handball event 156 and are received by a player 151. A substitution event 217 defines replacement of a player 153 with another player 152. Source medias 157, 158, and 159 specify resources that may be used to later reproduce the yellow card event 215, the red card event 216, and the substitution event 217, respectively.

Figure 2C:
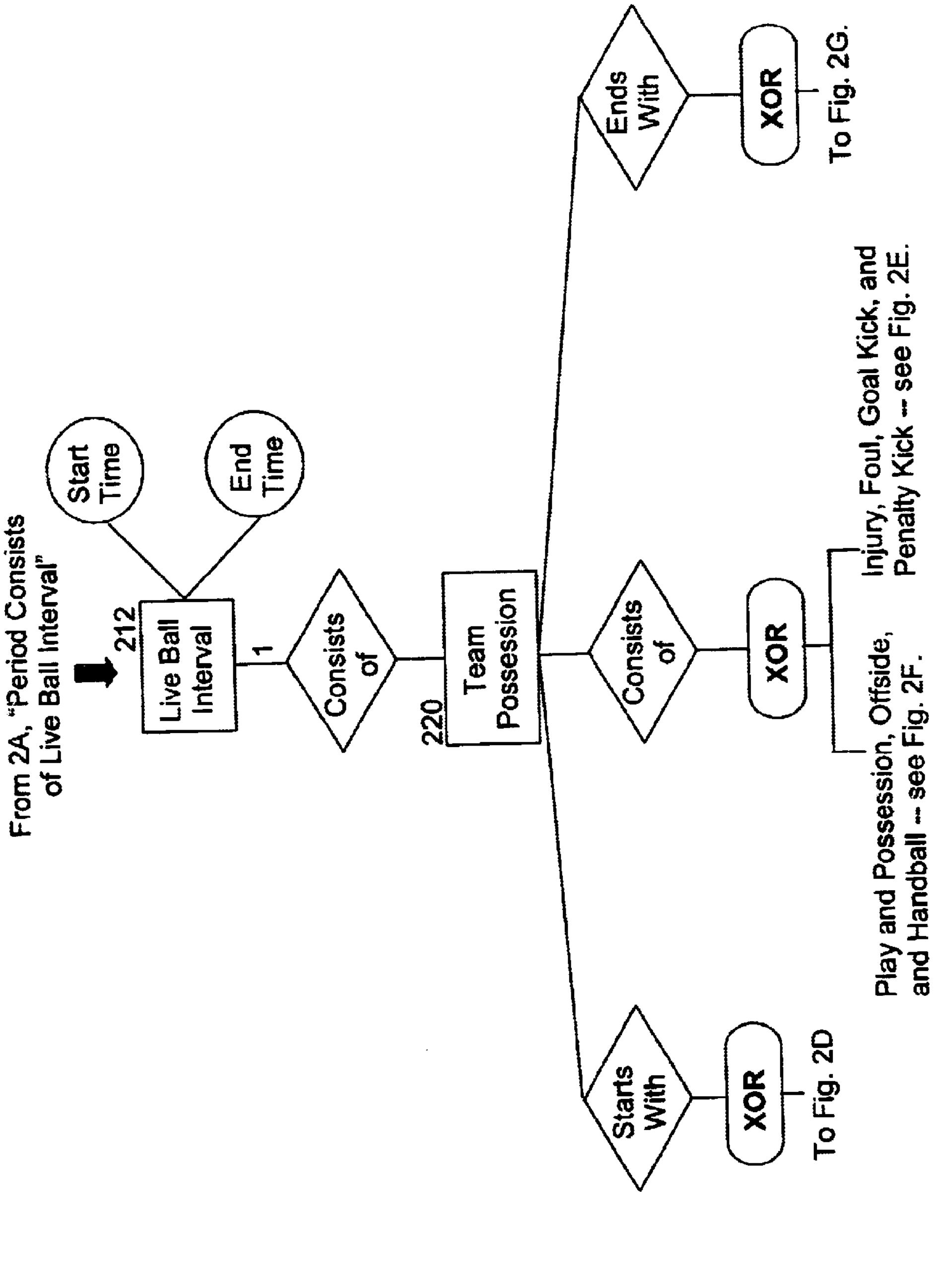
Figure 2D:
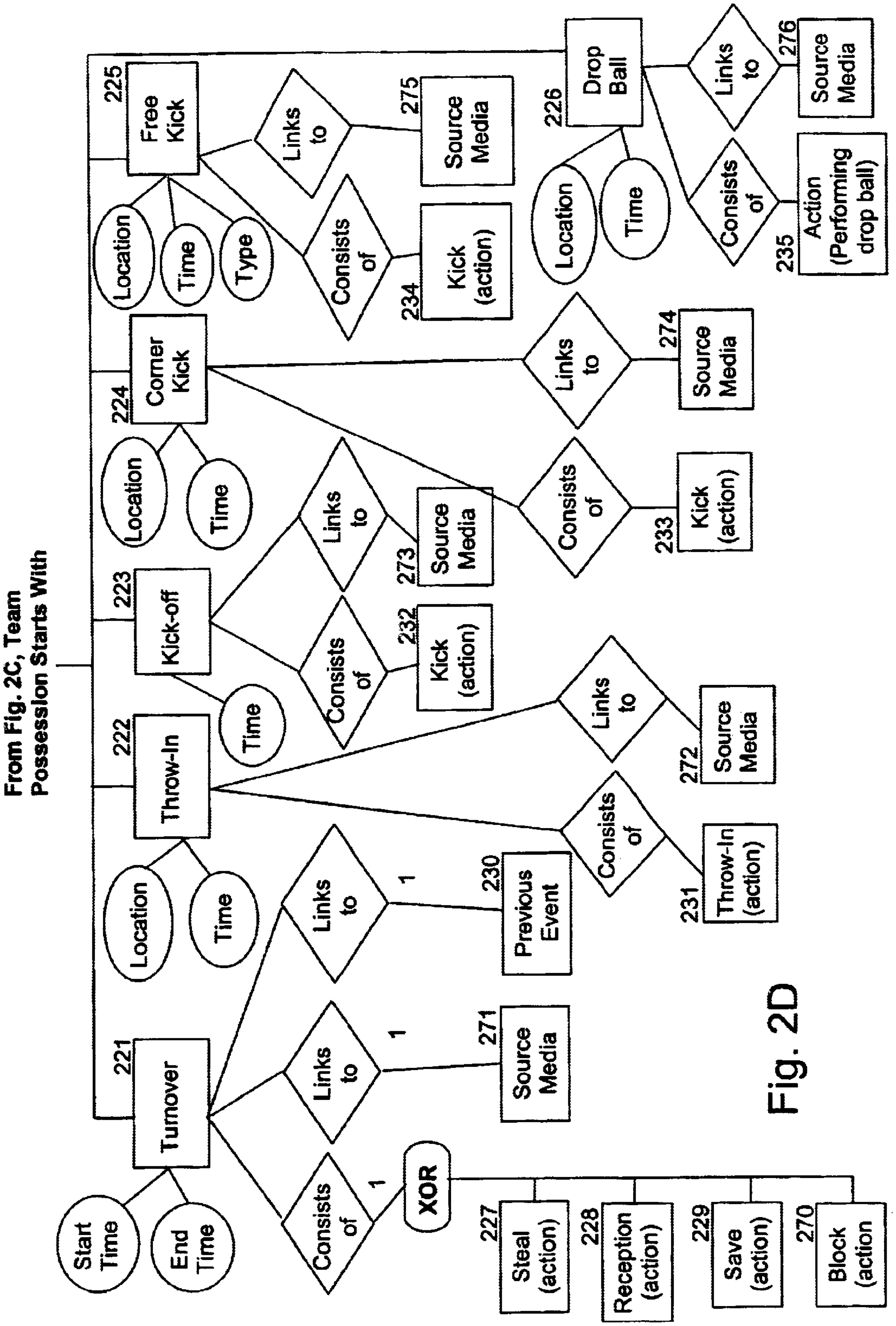

As shown in FIG. 2C, a start time and a stop time are associated with each Live Ball Interval 212, each of which consists of a number of team possession events 220. As shown in FIG. 2D, a team possession event starts with one of a turnover event 221, a throw-in event 222, a kick-off event 223, a corner kick event 224, a free kick event 225, or a drop ball event 226. A turnover event 221 further consists of a player stealing the ball from another player (steal event 227), a player controlling a loose ball (reception event 228), a player blocking the ball from another player (block event 270), or a player saving a ball (save event 229). A turnover event 221 links to a previous event 230 causing the turnover (event 221).

Similarly, a throw-in event 222 consists of a throw-in action 230; and a kick-off event 223, corner kick event 224, and a free kick event 225 consist of kick actions 232, 233, 233, and 234, respectively. A drop ball event 226 consists of a drop ball action 235. Source medias 271, 272, 273, 274, 275, and 276 specify resources that may be used to later reproduce the previous event 230, the throw-in action 231, kick actions 232, 233, 234, and drop ball action 235, respectively.

Figure 2E:
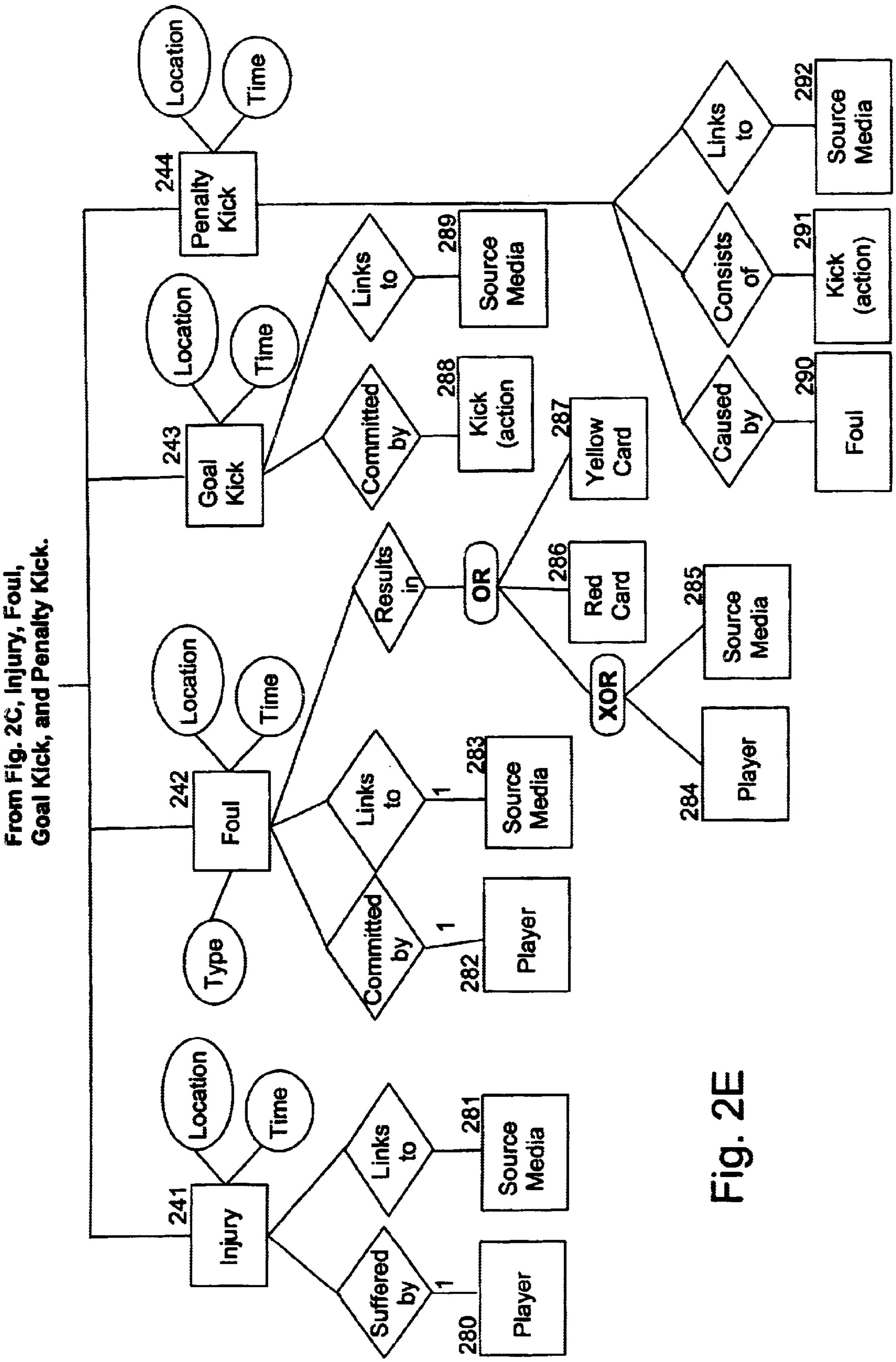
Figure 2F:
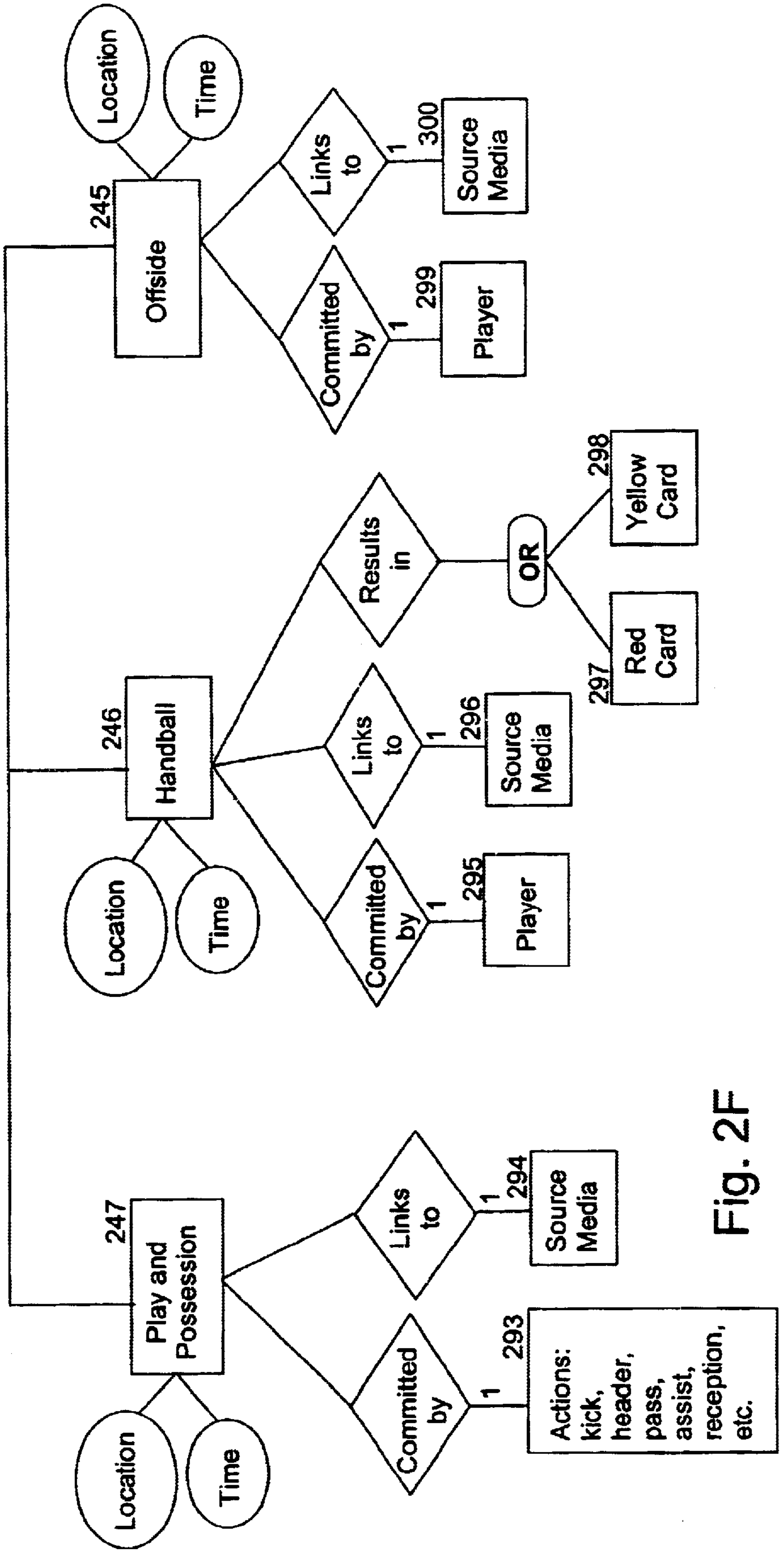

FIGS. 2E and 2F illustrate events that may occur during a team possession event 220. As shown in FIGS. 2E and 2F, a team possession may include injury events 241, foul events 242, goal kick events 243, penalty kick events 244, offside events 244, handball events 246, and miscellaneous play and possession events 247. The properties and events 280–300 that comprise each of events 241–247 are shown in FIGS. 2E and 2F are self-explanatory and thus will not be described further herein.

Figure 2G:
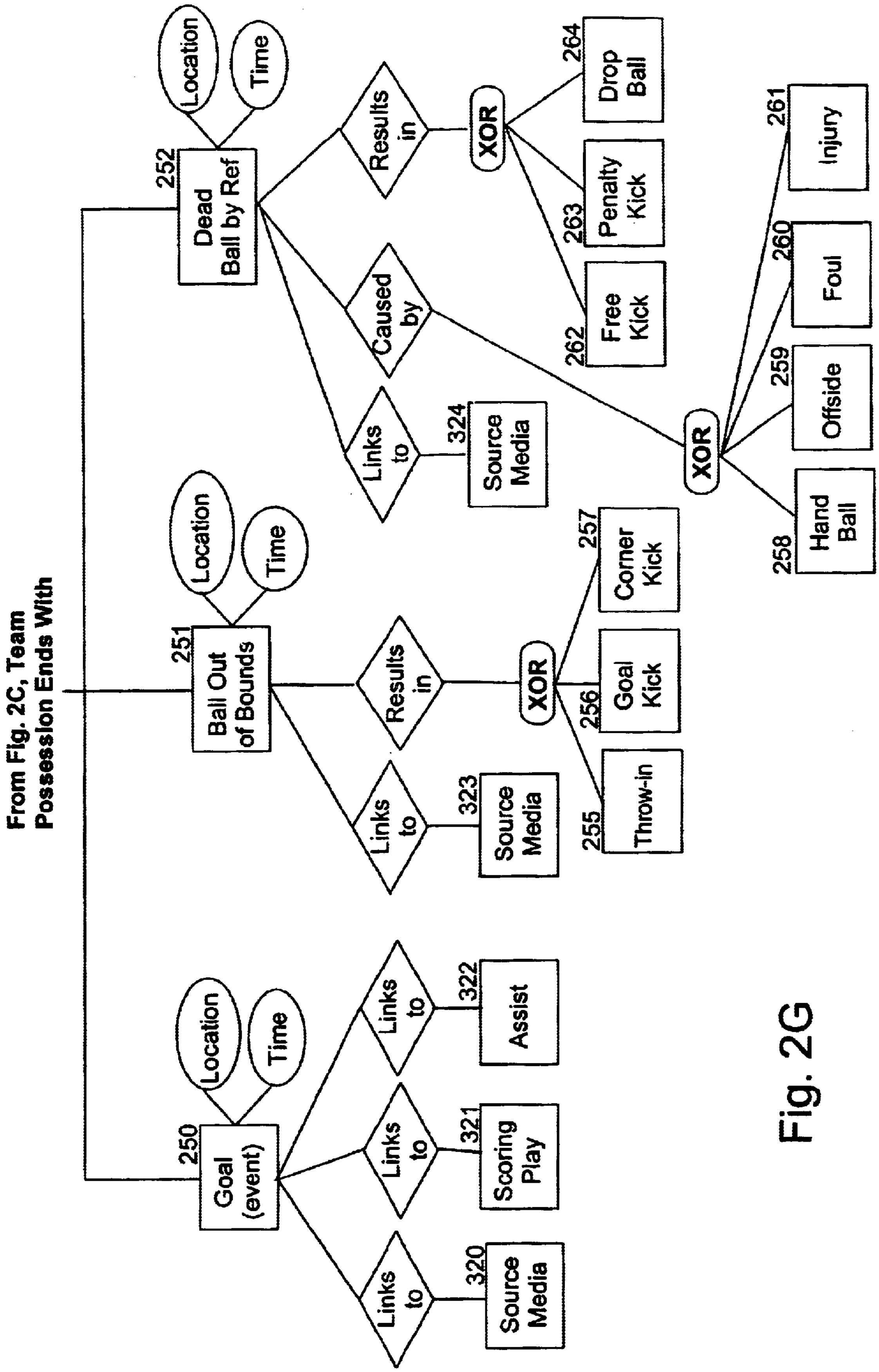

FIG. 2G illustrates the ending events for a team possession 220. As shown, a team possession may end with a goal event 250 or dead ball events 251 and 252. Goal event 250 may result in a scoring play event 321 and/or an assist event 322. Dead ball event 251 refers to the soccer ball going out of bounds, which results in one of a throw-in (action 255), a goal kick (action 256), or a corner kick (action 257). Dead ball event 252 is caused by a hand ball (258), a player being offside (259), a foul (260), or an injury (261), and results in one of a free kick (action 262), a penalty kick (action 263), or a drop ball (action 264). Source medias 320, 323, and 324 specify resources that may be used to later reproduce the goal event 250, the ball out of bounds event 251, and the dead ball by referee event 252, respectively.

Based on the hierarchical event model shown in FIGS. 2A–2G, events in the soccer game can be graphically modeled. Semantic events received from event collection and detection section 101 about a soccer game are placed in the hierarchical event model. For example, a particular soccer game may begin with the following series of events: a period event 201, a live ball interval 210, a kick-off event 223, a first miscellaneous play and possession event 247, a second miscellaneous play and possession event 247, and a goal event 250. This series of events corresponds to a period that begins with a kickoff and then is followed by two plays on the ball that result in a goal being scored.

Event synthesis engine 103 uses the detected semantic events and their hierarchical arrangement in hierarchical event model 102 to generate a probabilistic model including relationships between sequences of events occurring in hierarchical event model 102. Additional information, such as information describing individual player attributes, such as the relative speed or skill of a particular player, may be pre-stored in database 105 and incorporated into the model used by event synthesis engine 103.

Figure 3:
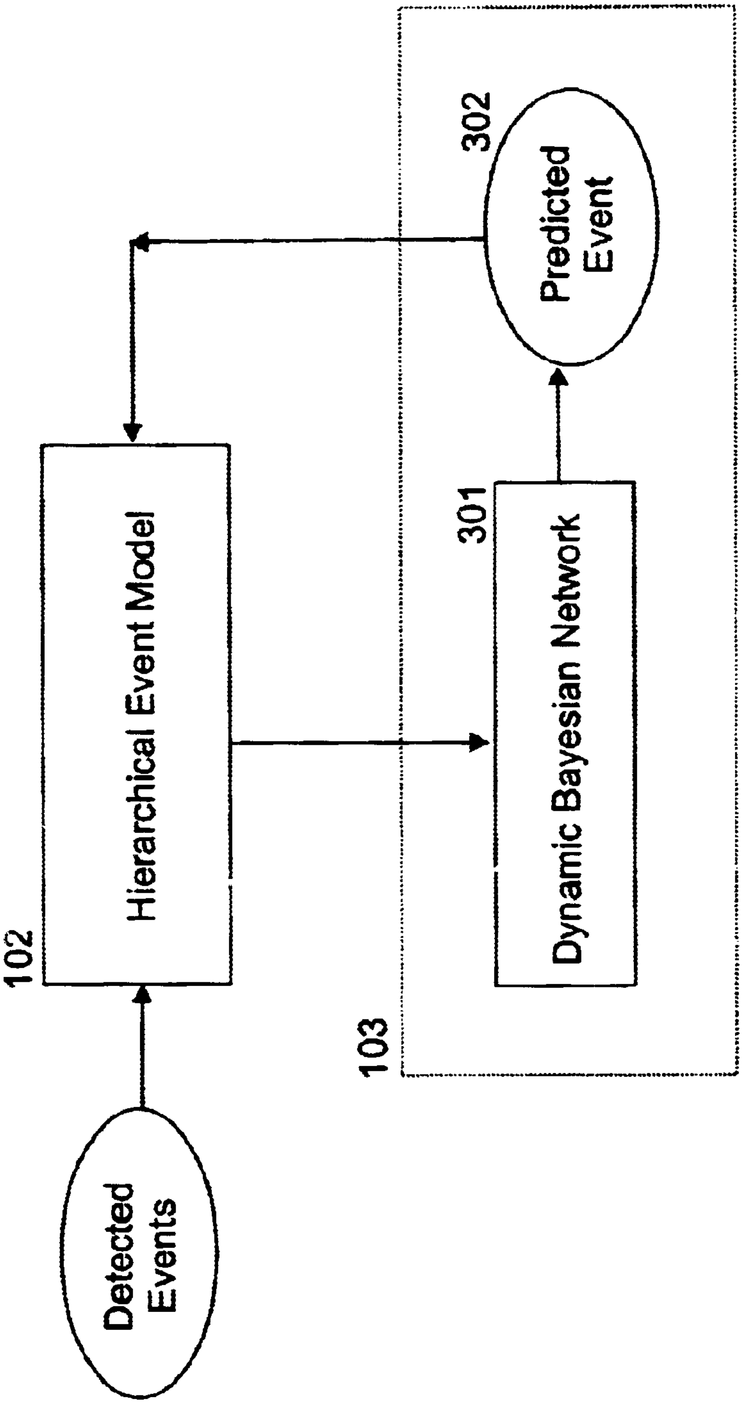
FIG. 3 is a diagram illustrating the interaction of the event synthesis engine and the hierarchical event model.

FIG. 3 is a diagram illustrating in additional detail the interaction of event synthesis engine 103 and hierarchical event model 102. Event synthesis engine includes a dynamic Bayesian network 301. In general, Bayesian networks are graphical models for performing statistical inference based on Bayes' rule. Nodes in a Bayesian network are assigned conditional probability distributions specifying the probability that a child node takes on the value of its parent node.

One property of Bayesian networks is that observed values (i.e., detected semantic events), are used to construct the model. Bayesian network 301 is a dynamic network because the model may change during the session as additional semantic events are received. Events predicted by Bayesian network 301, labeled as predicted events 302, may be fed back into hierarchical event model 102 such that event model 102 is iteratively modified based on predicted as well as detected events.

Bayesian networks are generally well known in the art. Bayesian networks support the use of probabilistic inference to update and revise belief values. Bayesian networks readily permit qualitative inferences without the computational inefficiencies of traditional joint probability determinations. In doing so, they support complex inference modeling including rational decision making systems, value of information and sensitivity analysis. As such, they may be used for causality analysis and through statistical induction they support a form of automated learning. This learning can involve parametric discovery, network discovery, and causal relationship discovery.

More particularly, Bayesian network 301 is constructed as a graphical network of nodes based on the hierarchical event model. Causal relationships between nodes are defined by conditional probabilities learned from sample data. The conditional probabilities may be learned using a number of well known learning (i.e., training) algorithms. A nonexhaustive list of these algorithms includes: Maximum Liklihood, Maximum Aposterior Estimator, Gibbs-Sampler, Minimum Description Length, and the Expectation Maximization Algorithm.

As an example of the use of Bayesian Networks to predict and synthesize events in a soccer game based on the hierarchical model shown in FIG. 2, assume that a corner kick occurs at a given time during the game. Corner kick event 224 starts a team possession 220. During the team possession, team possession events occur, such as play and possession events 247 (e.g., kick, header, pass, etc.), handball events 246, and offside events 245. The Bayesian network is established based on the hierarchical event model that includes conditional probabilities for each of the event nodes in the hierarchical model. The conditional probabilities are established by training the Bayesian network on the sample data. As discussed above, training of graphical Bayesian networks from sample data is known in the art. The trained Bayesian network can then be used to predict what events may happen after the corner kick based on the conditional probabilities given a corner kick has occurred. For example, the Bayesian network may predict that a kick is the next event that occurs after the corner kick. This process can continue to thus result in a series of synthesized events for a soccer game starting from a given event, in this case a corner kick.

Gaming engine 104 renders a graphical simulation of the game modeled by hierarchical event model 102 and event synthesis engine 103. User 106 may, for example, interactively play the second half of a soccer game having a hierarchical event model and its associated Bayesian network initially trained on the first half of the soccer game. Actions taken by user 106 that differ from the actual flow of the game have their consequences predicted by event synthesis engine 103. In this manner, gaming engine 104 can present a highly realistic simulation of the sporting game in which the consequences of actions input by user 106 are modeled based on prior events in the actual match. Thus, users can realistically "be the coach" or "be the player," and simulate how a game may have turned out if different decisions were made at various points in the game.

The systems described above may be implemented with any of a number of well known computer processors and computer systems, such as computers based on processors from Intel Corporation, of Santa Clara, Calif. In one implementation, event synthesis engine 103 and hierarchical event model 102 may be implemented by a single computer or network of computers connected to a public network such as the Internet, and gaming engine 104 is executed by a computer system implemented locally to user 106 and connected to the event synthesis engine and the event model though the Internet. In an alternate implementation, gaming engine 104, event synthesis engine 103, and hierarchical event model 102 may all be implemented on a single computer system. Processors used to implement gaming engine 104, event synthesis engine 103, and hierarchical event model 102 accept program instructions from a computer storage device (e.g., optical or magnetic disk) or from a network.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A gaming system for simulating a sports match, the system comprising:

a hierarchical event model defining a hierarchical organization for semantic events occurring in the sports match;

an event synthesis engine that implements a probabilistic inference model that predicts future semantic events based on the semantic events in the hierarchical event model; and a gaming engine connected to receive the semantic events and the predicted future semantic events, the gaming engine rendering a simulation of the sports match based on the predicted future semantic events.

2. The system of claim 1, wherein the event synthesis engine further comprises a dynamic Bayesian network.

3. The system of claim 1, wherein the semantic events represent events occurring in the sports match that are meaningful to the outcome of the sports match.

4. The system of claim 3, further including:

an event detection and collection section configured to detect the semantically meaningful events from a live sports match and provide the semantically meaningful events to the hierarchical event model.

5. The system of claim 1, wherein the probabilistic inference model is iteratively modified based on the predicted future semantic events.

6. A method of simulating a sports match comprising:

arranging detailed semantic events occurring in a sports match in a hierarchical model;

predicting future semantic events in the simulated sports match using probabilistic reasoning techniques based on the hierarchical model; and rendering a simulation of the sports match based on the predicted future semantic events.

7. The method of claim 6, wherein the probabilistic reasoning techniques use Bayesian networks.

8. The method of claim 7, wherein the probabilistic reasoning techniques incorporate information relating to pre-stored attributes of players in the sports match.

9. The method of claim 6, further comprising detecting semantically meaningful events from a live sports match.

10. The method of claim 9, wherein the detected semantically meaningful events represent events occurring in a sports match that are meaningful to the outcome of the sports match.

11. A computer readable medium containing computer instructions that when executed by a processor cause the processor to simulate a sports match by performing acts comprising:

arranging semantic events occurring in the sports match in a hierarchical model;

predicting future semantic events in the simulated sports match using probabilistic reasoning techniques based on the hierarchical model; and rendering a simulation of the sports match based on the predicted future semantic events.

12. The computer readable medium of claim 11, wherein the probabilistic reasoning techniques use Bayesian networks.

13. The computer readable medium of claim 12, wherein the probabilistic reasoning techniques incorporate information relating to pre-stored attributes of players in the sports match.

14. The computer readable medium of claim 11, further comprising computer instructions for performing the acts including:

detecting the semantically meaningful events from a live sports match.

15. The computer readable medium of claim 14, wherein the detected semantic events represent events occurring in the sports match that are meaningful to the outcome of the sports match.

16. A gaming system for simulating a sports match, the system comprising:

hierarchical event model defining a hierarchical organization for all of the events occurring in the sports match, wherein the hierarchical event model can be represented as a graphic tree of events and branches of the graphic tree of events lead to sub-branches of the graphic tree of events that define events that may occur given a parent event;

an event synthesis engine that implements a probabilistic inference model that predicts future semantic events based on the semantic events in the hierarchical event model; and a gaming engine connected to receive the semantic events and the predicted future semantic events, the gaming engine rendering a simulation of the sports match based on the predicted future semantic events.

17. The system of claim 16, further including an event detection system to detect semantically meaningful events from a live sports match, wherein the semantic events represent events occurring in the sports match that are meaningful to the outcome of the sports match and provide the semantically meaningful events to the hierarchical event model.

18. A method of simulating a sports match comprising:

arranging detailed semantic events occurring in a sports match in a hierarchical model, wherein the hierarchical event model can be represented as a graphic tree of events and branches of the graphic tree of events lead to sub-branches of the graphic tree of events that define events that may occur given a parent event;

predicting future semantic events in the simulated sports match using probabilistic reasoning techniques based on the hierarchical model; and rendering a simulation of the sports match based on the predicted future semantic events.

19. The method of claim 18, further including:

detecting semantically meaningful events from a live sports match, wherein the semantic events represent events occurring in the sports match that are meaningful to the outcome of the sports match.

* * * * *